United States Patent Office 2,757,174
Patented July 31, 1956

2,757,174
NEW COMPOSITIONS OF MATTER

Albert F. Hardman, Akron, Ohio, assignor, by mesne assignments, to The Goodyear Tire & Rubber Company, a corporation of Ohio No Drawing. Application April 24, 1952,
Serial No. 284,209

14 Claims. (Cl. 260—247.1)

This invention relates to new compositions of matter which are useful as accelerators in the vulcanization of natural and synthetic rubber and to methods for their preparation. The invention includes the accelerator compounds as well as their use in rubber and the rubber products obtained by such use.

Numerous accelerators of vulcanization are known and various types of vulcanized rubber may be obtained by the use of these accelerators. Thus, in U. S. Patent 2,484,621 the addition products of carbon bisulfide with the reaction products of naphthols, certain secondary amines and formaldehyde are described as being useful to accelerate the vulcanization of rubber. However, in that patent analogous compounds derived from monocyclic phenols were excluded since it was believed that the monocyclic phenolic compounds would not form addition products with carbon bisulfide. It has now been discovered that the monocyclic phenolic compounds will form addition products with carbon bisulfide when controlled reaction conditions are maintained. This invention, therefore, covers the addition products of carbon bisulfide with the reaction products of a monocyclic phenol, certain secondary amines and formaldehyde.

The reaction between the monocyclic phenol, formaldehyde and the secondary amine is believed to take place according to the following equation, showing the use of cresol as a typical monocyclic phenol:

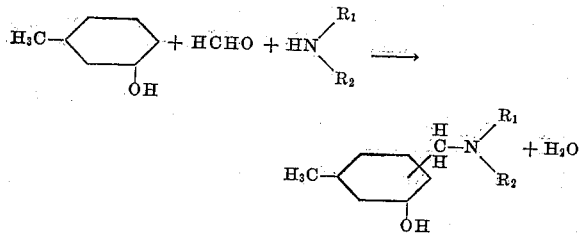

in which $R_1$ and $R_2$ represent aliphatic groups.

Then phenolic reaction product is subsequently reacted, according to the practice of this invention, with carbon bisulfide to form addition products which are the accelerators of the invention. It has also been found that the primary amines, such as cyclohexyl amine and methyl amine, will react with formaldehyde and monocyclic phenols to form amino-methylene-phenols and that these compounds form carbon bisulfide addition products. However, such products, derived from primary amines, are not effective accelerators of vulcanization. Therefore, this invention is directed to the carbon bisulfide addition products of the reaction products of a secondary amine, formaldehyde and a monocyclic phenol, corresponding to the general formula

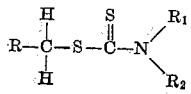

in which R is a monocyclic phenol residue and $R_1$ and $R_2$ are selected from the group consisting of aliphatic, cycloaliphatic, aralkyl, furfuryl and tetrahydrofurfuryl radicals and radicals in which $R_1$ and $R_2$ are joined to form a single cycloaliphatic radical.

It has been discovered, contrary to previous teaching, that the carbon bisulfide addition products of the above described monocyclic phenol reaction products will form if the reaction is conducted at elevated temperatures in the range of from 125 to 175° C. and at a pressure above atmospheric. While elevated temperatures and pressures are required to form most addition products of carbon bisulfide and the monocyclic phenolic-containing reaction product, certain monocyclic phenolic-containing reaction products, for example, that formed from 3,5-xylenol, will form addition products with carbon bisulfide at normal pressures and a temperature of about 90° C.

The preparation of the accelerator compounds is illustrated by the following examples:

Example 1

A mixture containing 24.5 grams of 3,5-xylenol, 53 grams of a 17% solution of dimethyl amine in water, and 17 grams of a 37% solution of formaldehyde in water was heated on a steam bath for 5 hours. The oil-like reaction product was separated from the water. To the reaction product was added 16 grams of carbon bisulfide. The mixture was refluxed for from 2 to 3 hours. When the reaction mixture was cooled there separated out 21 grams of crystals having a melting point of 150° C. Analysis showed the sulfur content to be 25.30% and 25.55% and the nitrogen content to be 5.31% and 5.23%. Calculated contents of sulfur and nitrogen for the formula shown below are 25.10% and 5.50% respectively. To the analyzed reaction product the following formula is ascribed:

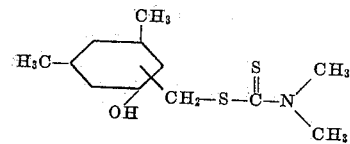

Example 2

A mixture of 22 grams of m-cresol, 49 grams of a 18.5% solution of dimethyl amine in water, and 16 grams of a 37% solution of formaldehyde in water was stirred for 3 hours at room temperature. The mixture was then cooled in an ice bath. Crystals were obtained which, when purified, melted at 46–47° C. Analysis showed the nitrogen content to be 8.16 and 8.07%. Calculated nitrogen content for the formula presented below is 8.48%. The following formula is ascribed to the reaction product:

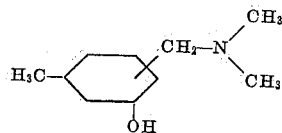

The dimethyl-amino-methyl-m-cresol (59 grams) was placed in a flask to which 32 grams of carbon bisulfide was added. The mixture was refluxed for 4 hours and then cooled. Crystals melting at 46–47° C. were obtained showing that no reaction had occurred and that the starting material was unchanged.

Example 3

The dimethyl-amino-methyl-m-cresol (18 grams) prepared according to Example 2 was sealed in a glass tube along with 10 grams of carbon bisulfide. The sealed glass tube was heated to 150° C. for 6 hours. After cooling, a viscous reaction product was obtained which, when purified by recrystallization from methyl alcohol, melted at 106° C. Analysis for sulfur content gave values of 25.97% and 25.65% and for nitrogen content 5.60% and 5.65%. The sulfur and nitrogen content of the compound whose formula appears below are calculated to be 26.50% and 5.81% respectively. The formula of the reaction product may be represented to be

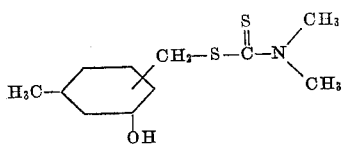

*Example 4*

The procedure described in Example 2 was followed with the exception that hydroquinone was used in place of m-cresol. No reaction was realized after refluxing the hydroquinone compound with carbon bisulfide.

*Example 5*

A mixture of 22 grams of hydroquinone, 50 grams of a 37% solution of formaldehyde in water, and 120 cubic centimeters of a 25% solution of dimethyl amine in water was permitted to stand at room temperature for 3 days. Crystals separated which had a melting point of 175–180° C. The reaction product was believed to be bis(dimethyl-amino-methyl) hydroquinone. The hydroquinone derivative (22.5 grams) was sealed in a tube along with 20 grams of carbon bisulfide. The tube was heated for 6 hours at 150° C. After cooling, the contents of the tube included a solid mass of crystalline material which, after being washed with methyl alcohol, melted with decomposition at 185–187° C. A mixture of bis(dimethyl-amino-methyl) hydroquinone and its carbon bisulfide addition product melted with decomposition at 175°, indicating that the hydroquinone derivative had reacted with the $CS_2$ to produce a new compound. Analysis showed the sulfur content to be 35.93% and 35.61%, and the nitrogen content to be 7.25% and 7.28%. The calculated sulfur and nitrogen content of the compound whose formula appears below are 34.0% and 7.45% respectively. The formula of the reaction product may be represented to be

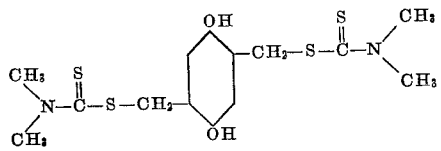

As shown in the foregoing examples, the products obtained by the reaction of the monocyclic phenol with formaldehyde and the amine may be crystalline or oily or resinous in character. Even where the carbon bisulfide product produced from the amino-methylene-phenol is resinous in character, the products are good accelerators and may be used without further purification.

Other carbon bisulfide addition products may be made in the same manner as described in Examples 1, 3 and 5. It should also be apparent that, if desired, the amine may be employed in the reaction in the form of a salt, such as the hydrochloride.

The accelerator compounds may also be prepared by methods other than those shown in Examples 1, 3 and 5. For instance, if desired, the amine, formaldehyde, phenol and carbon bisulfide may be mixed and reacted simultaneously. Alternatively, the amine and carbon bisulfide may be reacted to form a dithiocarbamate which is then reacted with the formaldehyde and the phenol.

Any monocyclic phenol may be used in preparing the accelerators of the invention. Representative examples of the phenols which may be used are any of the cresols, xylenols, di- and tri-hydroxy benzenes, substituted phenols such as tertiary butyl phenol, tertiary butyl cresol, octyl phenol, α-phenyl-ethyl-phenol, di α-phenyl-ethyl-phenol, di-octyl-phenol, and phenols with mixed substituents such as α-phenyl-ethyl cresol, butyl cresol, octyl cresol, α-phenyl-ethyl butyl phenol, etc.

Similarly, any secondary aliphatic or cycloaliphatic amine may be used to prepare the amino-methylene-phenols. Representative examples are the saturated straight chain dialiphatic amines such as dimethyl amine, diethyl amine, diamyl amine, dibutyl amine, and methyl ethyl amine; the unsaturated straight chain dialiphatic amines such as diallyl amine and dibutenyl amine; the branched chain dialiphatic amines such as di-isobutyl amine; the secondary amines containing cycloaliphatic radicals such as N-ethyl cyclohexyl amine, N,N'-dicyclohexyl ethylene diamine, and N-ethyl hexahydro phenetidine; the ring substituted aliphatic amines such as difurfuryl amine, N-isopropyl tetrahydrofurfuryl amine, and dibenzyl amine; and heterocyclic compounds containing a secondary amino nitrogen in the ring such as morpholine and piperidine. Of these, preferred amines are dimethyl amine, diethyl amine, dibutyl amine, morpholine, and piperidine.

Thus it will be seen that, in addition to the strictly aliphatic amines, various other amines of aliphatic characteristics may be employed. As indicated, these include, the cycloaliphatic or alicyclic amines, the aliphatic amines containing cyclic constituents such as aralkyl amines, furfuryl amines, tetrahydrofurfuryl amines, and the heterocyclic compounds containing a secondary amino-nitrogen in the ring.

The amino-methylene-phenols which may be reacted with carbon bisulfide according the the present invention may be represented by the structural formula

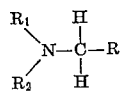

in which R is a monocyclic phenolic residue and $R_1$ and $R_2$ are selected from the group consisting of aliphatic, cycloaliphatic, aralkyl, furfuryl and tetrahydro furfuryl radicals and radicals in which $R_1$ and $R_2$ are joined to form a single cycloaliphatic radical.

The accelerator compounds may also be defined as the addition product of carbon bisulfide and an amino-methylene-phenol in which the amino-methylene group has the structural formula

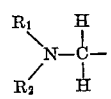

in which $R_1$ and $R_2$ are selected from the group consisting of aliphatic, cycloaliphatic, aralkyl, furfuryl and tetrahydro furfuryl radicals and radicals in which $R_1$ and $R_2$ are joined to form a single cycloaliphatic radical.

Representative examples of the accelerator of this invention were incorporated into rubber in accordance with the following formula, in which parts are by weight:

| | |
|---|---|
| Rubber | 100.0 |
| Zinc oxide | 5.0 |
| Sulfur | 3.0 |
| Accelerator | As shown |

Samples were vulcanized for the time indicated and tested to give the following results, in which the tensile is represented as pounds per square inch, the modulus as pounds required to elongate the specimen the percentage indicated, and the elongation as percent.

| Accelerator | Captax | No. 1 | No. 3 | No. 5 |
|---|---|---|---|---|
| Amount | 0.50 | 0.10 | 0.10 | 0.50 |
| Cured 35 minutes at 240° F.: | | | | |
| Tensile | 1,950 | 1,930 | 2,050 | 1,700 |
| Elongation | 830 | 855 | 835 | 900 |
| 500% Modulus | 285 | 255 | 290 | 200 |
| 700% Modulus | 955 | 835 | 960 | 620 |
| Cured 35 minutes at 260° F.: | | | | |
| Tensile | 2,260 | 2,000 | 2,030 | 2,300 |
| Elongation | 795 | 800 | 805 | 740 |
| 500% Modulus | 370 | 320 | 300 | 460 |
| 700% Modulus | 1,340 | 1,100 | 1,100 | 1,750 |

Captax is mercaptobenzothiazole.
Accelerator No. 1, 3 and 5 are those prepared according to Examples 1, 3 and 5 respectively.

The test data indicate that the accelerators of the invention give rapid cures comparable to those obtainable by the use of Captax even where the present accelerators are used in lesser amounts.

The accelerator compounds may also be used in the cure of various synthetic rubber-like materials such as the copolymers of butadiene with styrene, acrylonitrile and the like.

While certain representative embodiments and details have been shown for the purpose of illustrating the invention, it will be apparent to those skilled in this art that various changes and modifications may be made therein without departing from the spirit or scope of the invention.

I claim:

1. As new compositions of matter, the N,N-disubstituted-thiocarbamyl-thiomethyl monocyclic phenols defined by the structural formula

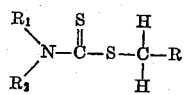

in which R is a monocyclic phenol residue and $R_1$ and $R_2$ are selected from the group consisting of aliphatic, cycloaliphatic, aralkyl, furfuryl and tetrahydrofurfuryl radicals and radicals in which $R_1$ and $R_2$ are joined to form with the nitrogen atom a radical selected from the group consisting of morpholinyl and piperidinyl radicals.

2. The compositions defined by claim 1 in which $R_1$ and $R_2$ are alkyl radicals.

3. The compositions defined by claim 1 in which $R_1$ and $R_2$ are joined to form a single cycloaliphatic radical.

4. The compositions defined by claim 2 in which $R_1$ and $R_2$ are methyl radicals.

5. The compositions defined by claim 2 in which $R_1$ and $R_2$ are butyl radicals.

6. The compositions defined by the formula

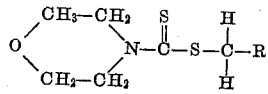

in which R is a monocyclic phenol residue.

7. The compositions defined by claim 4 in which R is the phenol residue of a cresol.

8. The compositions defined by claim 5 in which R is the phenol residue of a cresol.

9. The compositions defined by claim 6 in which R is the phenol residue of a cresol.

10. The compositions defined by claim 1 in which R is the phenol residue of a cresol.

11. The compositions defined by claim 1 in which R is the phenol residue of a xylenol.

12. The compositions defined by claim 11 in which $R_1$ and $R_2$ are alkyl radicals.

13. The compositions defined by claim 12 in which $R_1$ and $R_2$ are methyl radicals.

14. The method of making an N-N-disubstituted-thiocarbamylthiomethyl monocyclic phenol which comprises reacting together carbon bisulfide, formaldehyde, a monocyclic phenol, and a secondary amine of the following formula

in which $R_1$ and $R_2$ are selected from the group consisting of aliphatic, cycloaliphatic, aralkyl, furfuryl and tetrahydrofurfuryl radicals and radicals in which $R_1$ and $R_2$ are joined to form with the nitrogen atom a radical selected from the group consisting of morpholinyl and piperidinyl radicals, said reaction being conducted at a temperature between 125°C. and 175° C. and at a pressure above atmospheric.

References Cited in the file of this patent
UNITED STATES PATENTS 2,484,621    Hardman _____ Oct. 11, 1949